March 29, 1932.     G. SICK     1,851,528
ELECTRIC SADIRON
Filed Oct. 13, 1930
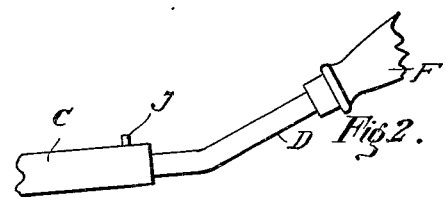
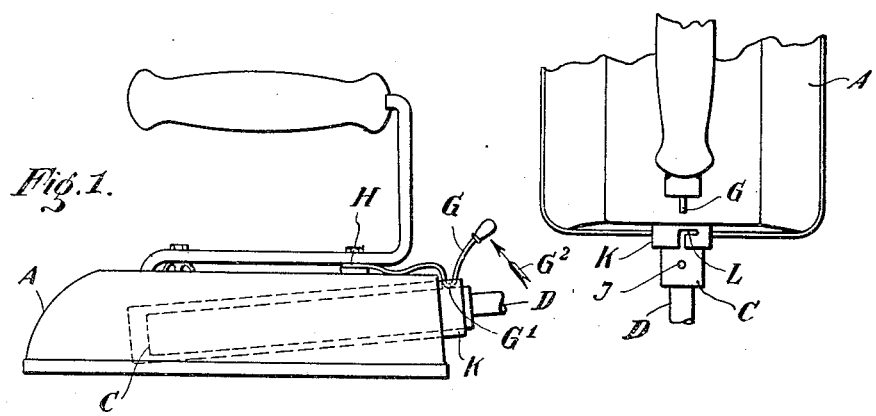
INVENTOR
G. Sick Patented Mar. 29, 1932                                       1,851,528

UNITED STATES PATENT OFFICE

GEORGES SICK, OF LAUSANNE, SWITZERLAND

ELECTRIC SADIRON

Application filed October 13, 1930, Serial No. 488,507, and in Switzerland October 15, 1929.

The present invention relates to sad-irons heated by means of a removable heating body enclosed therein and has for its object, means whereby the heating body is retained removably within the ironing body of said sadiron, so that it may be used successively for a number of irons.

The annexed drawings represent as an example one working form of a sad-iron according to the present invention.

Fig. 1 is a side elevation of a sad-iron.

Fig. 2 is a side view of a portion of a heating body with its handle, and,

Fig. 3 is a plan view of the heating body somewhat withdrawn from the ironing body.

In the drawings the solid ironing body A of the sad-iron has a cylindrical cavity formed therein at an inclination from the back end of the said body. A sleeve K is fitted into this perforation and is adapted to receive a cylindrical heating element C provided with a bent-up handle DF. This handle is hollow and serves as a guide for an electric cable connecting the heating element C with a source of electric current.

The outer end of the sleeve K projects to some extent from the cavity of the ironing body and has a slot L cut into said projecting end. This slot comprises an axially and a transversely directed branch and is shaped to receive a peg J projecting from the heating element C so that this heating element after having received a slight turn whereby the peg J enters the transverse branch of the slot L, will be retained removably within said sleeve. A spring H is attached to the top of the ironing body and has a hook G' adapted to engage the axial branch of the slot L and serves as means for maintaining the heating element in its locked position, said spring having a button G² therein serving as means for actuating said spring and for removing the heating element in order to insert it into another reserve sad-iron.

If it is desired to do so the button is pressed and the heating element is given a slight turn, then this latter may be easily withdrawn from the sleeve.

What is claimed is:

In a sad-iron having a solid body provided with an inclined cavity opening at the rear end of the body, a sleeve adapted to engage in the cavity and having one end projected therefrom, a heating element in the sleeve, the projecting end of the sleeve having an axial slot and a transverse slot, a spring connected with the body and having a hook carried thereby adapted to engage said axial slot, a heating element fitted in said sleeve and having a peg carried thereby adapted to engage the transverse slot to retain the heating element removably engaged in the sleeve, and a bent-up handle attached to the heating element and an electrical conductor engaged in the handle for conducting current to the heating element.

In testimony whereof I affix my signature.

GEORGES SICK.